No. 816,331. PATENTED MAR. 27, 1906.
S. H. JONES & E. E. TOWLE.
SPEED DEVICE FOR SEEDING MACHINES.
APPLICATION FILED NOV. 25, 1905.

3 SHEETS—SHEET 2.

Witnesses
Inventors
Sylvester H. Jones
and Elmer E. Towle
By Staley & Bowman
Attorneys

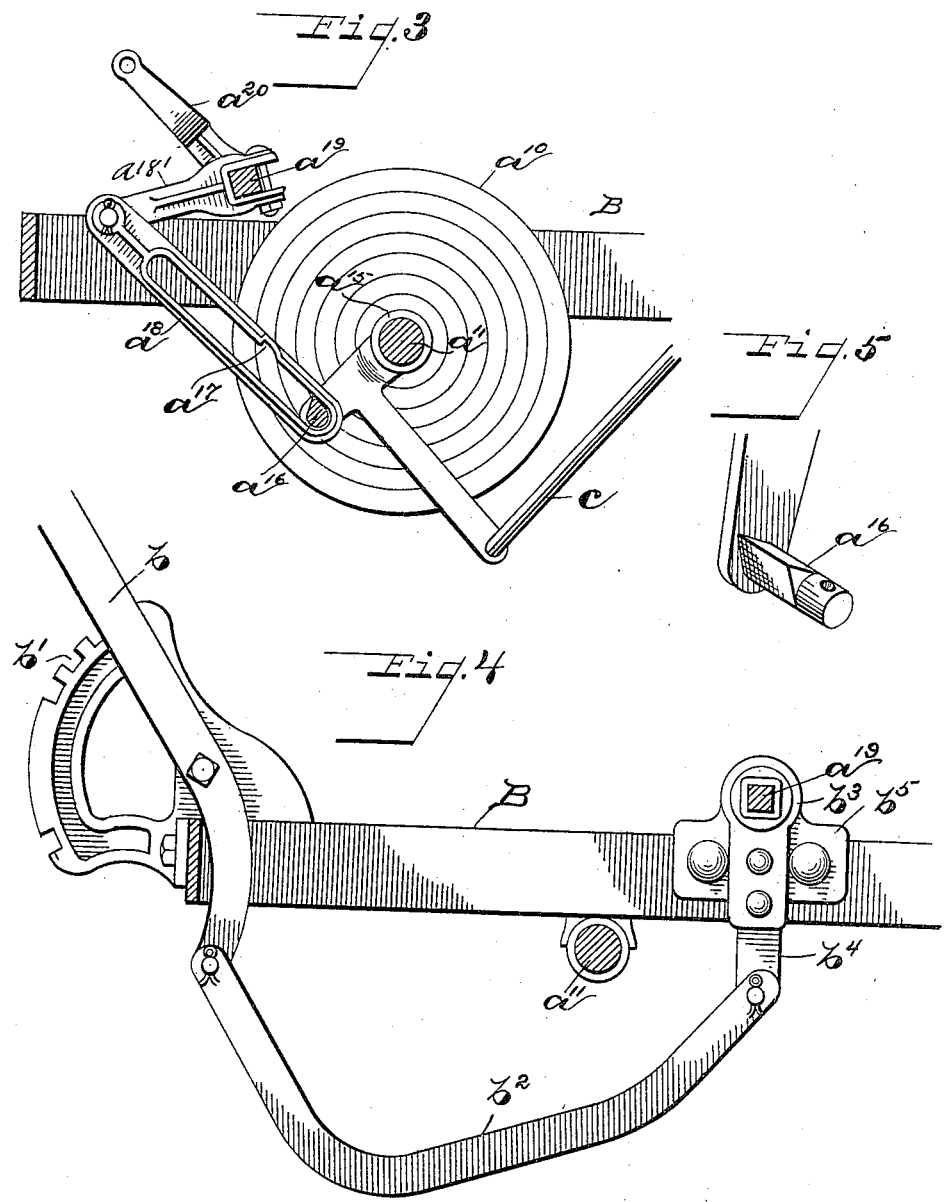

UNITED STATES PATENT OFFICE.

SYLVESTER H. JONES AND ELMER E. TOWLE, OF RICHMOND, INDIANA, ASSIGNORS TO AMERICAN SEEDING MACHINE COMPANY, OF JERSEY CITY, NEW JERSEY, A CORPORATION OF NEW JERSEY.

SPEED DEVICE FOR SEEDING-MACHINES.

No. 816,331.     Specification of Letters Patent.     Patented March 27, 1906.

Application filed November 25, 1905. Serial No. 289,005.

*To all whom it may concern:*

Be it known that we, SYLVESTER H. JONES and ELMER E. TOWLE, citizens of the United States, residing at Richmond, in the county of Wayne and State of Indiana, have invented certain new and useful Improvements in Speed Devices for Seeding-Machines, of which the following is a specification.

Our invention relates to improvements in grain-drills, and more particularly to the device connected with the parts known as the "distributing devices" and the "lifting means" for the furrow-openers.

The object of our invention is to construct a machine in such manner that the distributing devices may be disconnected from the main operating device at the will of the operator, but so arranged that whenever the furrow-openers are in the ground and the machine thus arranged to sow the grain the distributing device will automatically be connected with the main operating device, so that when the machine is run over the ground the grain or fertilizer will always be sown.

Figure 1:
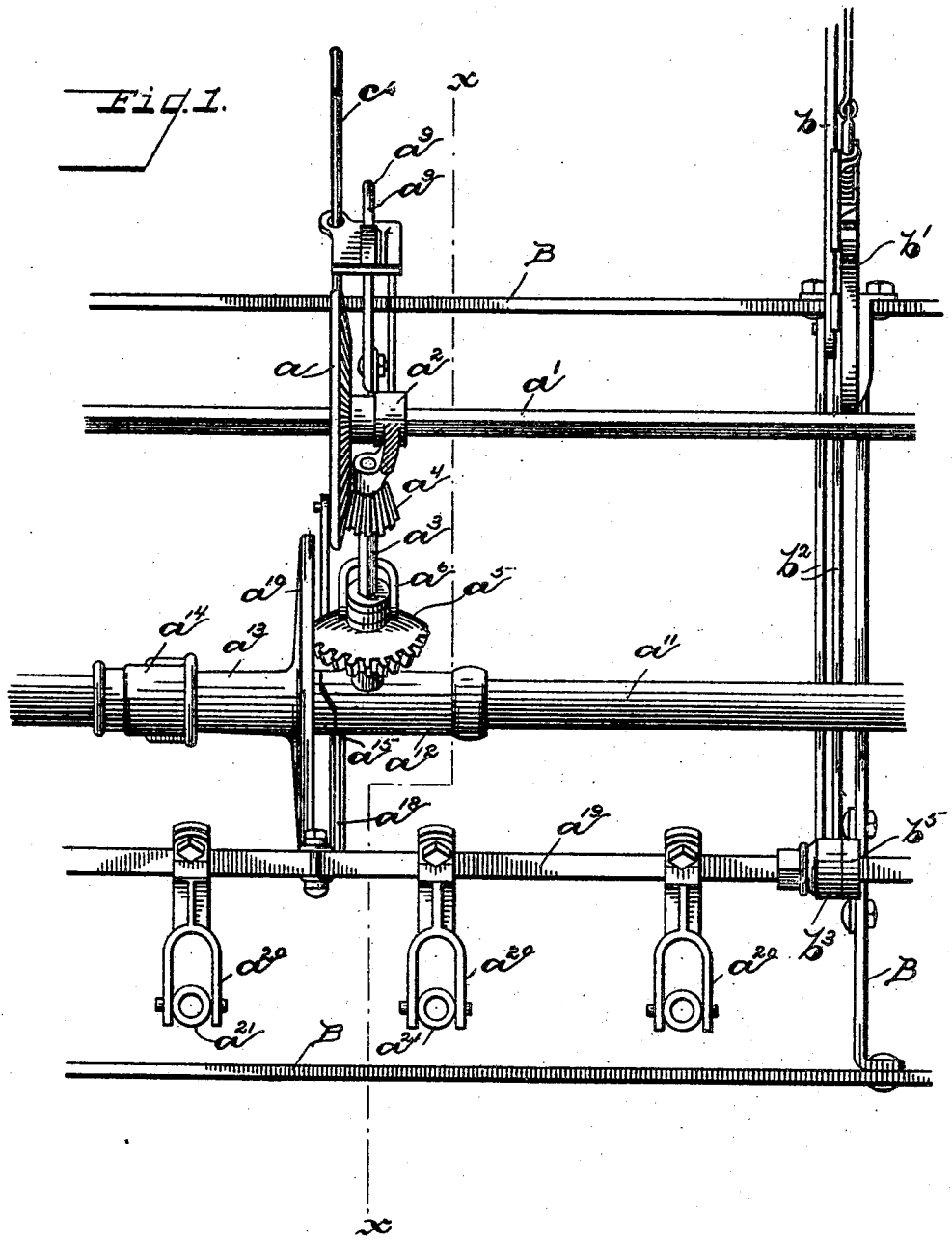
Figure 2:
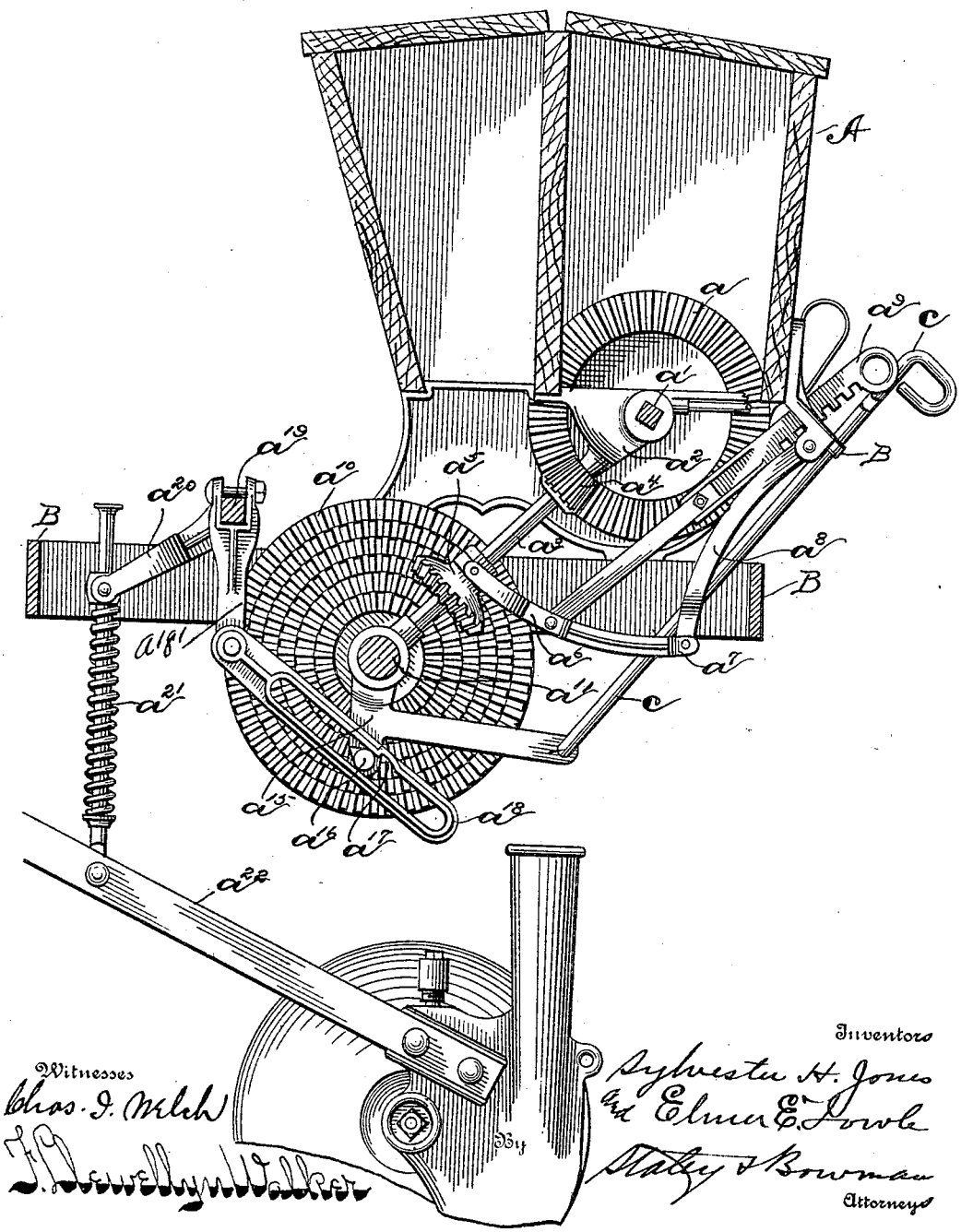

In the drawings, Figure 1 is a plan view, the hopper of the machine being removed. Fig. 2 is a sectional view on the lines $x$ $x$ of Fig. 1, and Figs. 3, 4, and 5 are detail views of the lifting mechanism and parts of the change-of-speed device.

Like letters of reference indicate like parts throughout the different views.

The hopper of the machine is indicated by A, it being understood that this is the receptacle for the seed and fertilizer. The framework of the machine is lettered B. The distributing devices (not shown) are mounted on the shaft $a'$. This is termed the "distributing-wheel" shaft, the distributing-wheels not being shown.

Rigidly journaled on the shaft $a'$ is the beveled gear-wheel $a$, Fig. 1. The bearing $a^2$ is supported on the shaft $a'$ and at its lower end forms a bearing for the upper end of the gear-shaft $a^3$. The gear-wheel $a^4$ is journaled securely to the upper part of said shaft $a^3$, and the beveled gear $a^5$ is mounted so as to be capable of sliding on said shaft $a^3$. The shifting mechanism for this beveled gear $a^5$ is shown in detail in Fig. 2 and comprises a yoke $a^6$, which is connected with a rearwardly-extending arm $a^7$, pivoted at its outer end to the upwardly-extending arm $a^8$, which in turn is pivoted to the hopper A. The indicator-rod $a^9$, formed with teeth at its upper end for the purpose of holding same in proper adjustment, is bisected and made in two parts, with an adjustment consisting of an elongated hole in the end of one part, so as to facilitate in setting the beveled gear $a^5$ in proper relation to the rows of teeth on disk wheel $a^{10}$, and is pivoted at its lower end to the shifting device comprising the yoke $a^6$ and arm $a^7$, and it is apparent that by raising and lowering said rod $a^9$ the beveled gear $a^5$ will be slid up and down on the gear-shaft $a^3$. The teeth on this beveled gear $a^5$ are adapted to mesh with the teeth formed on the disk $a^{10}$. It will be seen that this disk $a^{10}$ is formed with a series of concentric rows of gear-teeth, and by arranging the beveled gear so that it will mesh with the different rows of teeth on the disk $a^{10}$ the change of speed for the wheel $a$ and the distributing-wheel shaft $a'$ is effected.

The driving-axle shaft is indicated by $a^{11}$. (See Fig. 1.) On this shaft or axle there is journaled a sleeve $a^{12}$, which acts as the support for the lower end of the gear-shaft $a^3$. This sleeve, therefore, constitutes a bearing for the lower end of the shaft $a^3$, and at its inner end the sleeve $a^{12}$ is formed with a cam-face. The disk $a^{10}$ is formed with a hub $a^{13}$ and is provided with elongated lugs on its outer end, (not shown,) which engage in grooves in housing $a^{14}$. The housing $a^{14}$ is secured to the shaft $a^{11}$. The disk wheel $a^{10}$ is capable of longitudinal movement independent of the shaft $a^{11}$ or the housing $a^{14}$. An ordinary coil-spring (not shown) is located within the housing $a^{14}$, which normally holds the hub $a^{13}$ and disk $a^{10}$ in proper position, so that the teeth formed on the disk will mesh with the teeth on the beveled gear. There is loosely supported on the shaft $a^{11}$ a shifting device $a^{15}$, comprising a sleeve which is located between the sleeve $a^{12}$ and the disk $a^{10}$, provided with an opposing cam-face adjacent to the one on the sleeve $a^{12}$ and having a downwardly-projecting crank-arm. On one end there is formed a projecting pin $a^{16}$. The other end of said arm is pivotally connected to the handle $c$. In the position shown in Fig. 2 the disk $a^{10}$ is in normal engaging position, and the distributing-shaft $a'$ will be operated by the gear connection with the axle or shaft $a^{11}$.

It will be noticed that in this position of the parts the pin $a^{16}$ is shown in a position such that the link $a^{18}$ may be slid back and forth without in any way affecting the shifter $a^{15}$; but when the disk $a^{10}$ is moved out of engaging position the shifter $a^{15}$ and pin $a^{16}$ assume the position shown in Fig. 3, and in this position the projecting body of the pin $a^{16}$ will engage the notch $a^{17}$, formed in the upper part of the link $a^{18}$, and consequently when the link is slid back and forth the shifter $a^{15}$ will be positively operated in order to effect the engagement of the disk $a^{10}$ with the gear-wheel $a^5$.

From the fact that the sleeve of the shifter $a^{15}$ and the sleeve $a^{12}$ are formed with cam-faces, as indicated in Fig. 1, it will be seen that when the shifter $a^{15}$ is oscillated the disk $a^{10}$ will be slid longitudinally on the shaft $a^{11}$ against the tension of the spring within the housing $a^{14}$ until the disengagement of the disk $a^{10}$ and gear-wheel $a^5$ is effected. Consequently when the link $a^{18}$ forces the shifting device $a^{15}$ rearwardly, and thereby oscillates the sleeve of said shifting device, the spring within the housing $a^{14}$ will act to return the disk $a^{10}$ to normal or engaging position.

The link $a^{18}$ is pivoted to the lower end of the arm $a^{18'}$, which projects from the rock-shaft $a^{19}$. (See Figs. 1 and 2.) This rock-shaft is supported in bearings in the frame of the machine such that it is permitted to rock within said bearings. A series of arms $a^{20}$ project from said shaft. These arms connect in the usual way with a stem-rod $a^{21}$, which projects upwardly from the drag-bar $a^{22}$ of the furrow-opener, and the usual connection is shown, such that when the arm $a^{20}$ is depressed the spring $a^{21}$ is contracted and pressure applied to the furrow-openers; but when the arm $a^{20}$ is elevated it contacts against the projection formed in the upper part of the stem-rod $a^{21}$ and the furrow-openers are thereby positively raised out of operating position. In the position of the arm shown in Fig. 3 the furrow-opener connected therewith is raised out of operating position. It is apparent that by oscillating the rock-shaft $a^{19}$ the series of furrow-openers can be lifted out of operative position. This is effected by the connections between the rock-shaft $a^{19}$ and the lifting-lever $b$. (See Figs. 1 and 4.) The lifting-lever $b$ has the usual spring-pressed detent (not shown) which engages the notches formed on a stationary sector $b'$. The lifting-lever $b$ is pivoted to the frame of the machine and at its lower end is pivotally connected with the links $b^2$, which at their free ends are connected to the arm $b^4$, projecting downwardly from the rock-shaft $a^{19}$. The bearing for the rock-shaft is indicated by the plate $b^5$, which is secured to the frame B of the machine. The arm $b^4$ is formed with a hub $b^3$, which is rigidly secured to the rock-shaft, so that whenever the arm $b^4$ is oscillated the rock-shaft will also be oscillated.

The operation of the machine is as follows: When the operator desires to disconnect the distributing-shaft from the disk $a^{10}$, and thereby throw the distributing-wheels out of commission without lifting the furrow-openers, he will operate the handle $c$, and thereby oscillate the shifter $a^{15}$ and positively move the disk $a^{10}$ out of engaging position against the tension of the spring. Now the operator may raise and lower the furrow-openers by means of the lifting-lever $b$. It will be apparent that if this sequence of operation is followed the operator might fail to throw the distributing-wheels into commission and by thereafter depressing the furrow-openers into operating position operate his machine with the distributing devices out of commission, and thereby fail to sow the grain or fertilizer in the ground; but by reason of the pin $a^{16}$ and the notch $a^{17}$ in the link $a^{18}$ the operator is always sure that when he depresses the furrow-openers into the ground the distributing devices will be automatically thrown into commission and the machine properly operated. The devices are so arranged that when the furrow-openers are elevated the end of the slot formed in the link $a^{18}$ contacts against the pin $a^{16}$ and moves the shifting device $a^{15}$ until the gear $a^5$ is thrown out of engaging position. From Fig. 4 it will be seen that the notch at the lower end of the sector $b'$ is so arranged that the lifting-lever $b$ will be moved until the shifting device $a^{15}$ is operated, and then the lever will be held in that position by a detent engaging that particular notch.

As shown in Fig. 2, the handle or indicator-rod $a^9$ travels a very limited distance, this being desirable in grain-drill constructions in order to obviate the disadvantage of having the same protrude beyond the machine. By fulcruming the shifting device $a^6$ at the point indicated in Fig. 2 and pivoting the handle $a^9$ at a point intermediate the fulcrum-point and the point of engagement between the shifting device and the gear we are enabled to multiply the movement transmitted from the handle $a^9$ to the sliding gear $a^5$.

Having thus described our invention, what we claim is—

1. In a grain-drill, the combination of a distributer-shaft, with a main driving-shaft, change-of-speed devices between said shaft and said distributer-shaft, comprising a movable disk and gear, shifting device for said gear for throwing the distributer-shaft out of commission, furrow-opening devices and lifting mechanism therefor, means for manually operating the shifting device independent of the movement of the lifting mechanism, connections between said lifting mechanism and said shifting device whereby the shifting device will be operated by the depression of the furrow-opening devices, substantially as described.

2. In a grain-drill, the combination of a main driving-shaft with a distributer-shaft, furrow-opening devices, devices normally connecting said devices, lifting means for said furrow-opening devices, hand-operated shifting means for said connecting device, connections between said lifting mechanism and said distributer-shaft whereby the hand-operated shifting means will be operated during the movement of the lifting mechanism for the purpose of connecting the main driving-shaft and the distributer-shaft, substantially as described.

3. In a grain-drill, the combination of a main driving-shaft with a distributer-shaft, change-of-speed connections between said devices, furrow-opening devices, means for elevating and lowering the same, means for disconnecting the gear of the change-of-speed connections, and devices operated by the lifting mechanism for automatically connecting said gear connections subsequent to the operation of said disconnecting means and during the movement of the lifting mechanism, for the purpose specified.

4. In a grain-drill, the combination of a main driving-shaft and a distributer-shaft, a plurality of gears normally held in position to transmit movement from the main driving-shaft to said distributer-shaft, a shifting device adapted to operate upon said gear for disconnecting the distributer-shaft from the main driving-shaft, a furrow-opening device and lifting mechanism therefor, means connecting the lifting mechanism with the shifting device for automatically moving the shifting device for the purpose of connecting the main driving-shaft and the distributing devices during the movement of the depression of the furrow-opener, substantially as described.

5. In a grain-drill, the combination of a main driving-shaft and a distributer-shaft, connections between said devices, furrow-opening devices, and lifting devices therefor, a shifting device for the connections between the distributer and the main driving shaft, means operated by the lifting device for throwing said shifting device during both the elevating and depressing movement of the lifting device.

6. In a grain-drill, the combination of a change-of-speed device, comprising a disk with concentric circles of teeth, a sliding gear, a shifting device comprising a yoke and arm fulcrumed to the hopper, and a sliding handle pivoted to said arm between the fulcrum-point and the gear, for the purpose specified.

7. In a grain-drill, the combination of a change-of-speed device, comprising a disk with a plurality of teeth, a sliding gear member, a sliding handle or indicator-rod, means for multiplying the amount of movement transmitted from said handle to said gear member, for the purpose specified.

In testimony whereof we have hereunto set our hands this 17th day of November, A. D. 1905.

SYLVESTER H. JONES.
ELMER E. TOWLE.

Witnesses:
FRED J. CARR,
O. L. LOOFBOURROW.